United States Patent [19]

Wagner

[11] 3,995,755
[45] Dec. 7, 1976

[54] FRAME FOR SUPPORTING AN INDUSTRIAL LOADER BOOM ASSEMBLY

[75] Inventor: Joseph Francis Wagner, Dubuque, Iowa

[73] Assignee: Deere & Company, Moline, Ill.

[22] Filed: Feb. 6, 1975

[21] Appl. No.: 547,589

[52] U.S. Cl. .............................. 214/140; 172/776; 180/89.1; 296/28 R
[51] Int. Cl.[2] ........................................ E02F 3/80
[58] Field of Search .................. 214/140; 296/28 R; 180/89 R

[56] References Cited
UNITED STATES PATENTS

| | | | |
|---|---|---|---|
| 3,432,051 | 3/1969 | Borer et al. | 214/140 R |
| 3,465,839 | 9/1969 | Pensa | 214/140 |
| 3,870,172 | 3/1975 | Huber | 214/140 |
| 3,873,148 | 3/1975 | Kennicuit | 296/28 R |

*Primary Examiner*—Robert J. Spar
*Assistant Examiner*—Ross Weaver

[57] ABSTRACT

A loader boom support frame includes opposite upright sides including double-walled portions that have their undersides interconnected by front and rear crossbars, the crossbars being adapted for connecting the loader frame to a pair of longitudinally extending track support frames. Secured to the rear of the boom support frame so as to form an integral part thereof is a transverse transmission housing, the connection of the housing with the boom support frame including a pair of premachined compression links welded in abutting relationship to both the transmission housing and the rear crossbar. The rear ends of a pair of loader boom lift actuators are adapted to be connected to the opposite sides of the frame at receptacles located just forwardly of the rear crossbar in general fore-and-aft alignment with the compression links. The receptacles are mounted by structural members so located that forces imposed on the receptacles by the loader boom lift actuators during operation will be transmitted directly to the rear crossbar and then to the transmission housing by way of the compression links.

7 Claims, 4 Drawing Figures

FRAME FOR SUPPORTING AN INDUSTRIAL LOADER BOOM ASSEMBLY

BACKGROUND OF THE INVENTION

The present invention relates to a loader boom support frame and more particularly relates to such a frame designed so as to undergo a minimum of stress from loads imposed thereon by forces reacting through the loader boom lift actuators.

Loader boom support frames conventionally include opposite upright sides to which the rear ends of a pair of loader booms and a pair of loader boom lift actuators are pivotally connected. The structure of these known loader boom support frames is not entirely satisfactory since forces transferred to the support frame by the boom lift actuators are concentrated in the area surrounding pin receptacles which receive pins for coupling the actuators to the boom support frame and sometimes result in damage to the receptacles and/or the frame in the vicinity of the receptacles unless the sides of the frame are constructed of unduly thick material.

It is a common practice to weld or otherwise fix the transverse housing of the main drive transmission to the rear end of the loader boom support frame, the transverse housing in turn being used to support final drive housings at its opposite sides. The loader boom support frames heretofore known are not constructed in a manner conducive to the easy maintenance of tolerances for insuring that the main transmission housing will have the necessary degree of squareness with the support frame for properly disposing the final drive housings.

SUMMARY OF THE INVENTION

According to the present invention there is provided a novel loader boom support frame and more specifically there is provided a support frame designed so as to minimize stress concentrations produced by reactive forces transferred to the frame by the loader boom lift actuators.

A broad object of the invention is to provide a loader boom support frame with a boom lift actuator coupling structure and force-transmitting structure so located relative to a transverse transmission housing fixed to the rear of the frame and to a crossbar fixed to the underside of the frame that forces imposed on the coupling structure by the lift actuators are transferred first to the crossbar and then to the transmission housing.

A more specific object is to provide a boom support frame, as defined in the preceding paragraph, wherein the frame includes opposite double-walled side portions and the force-transmitting structure includes a compression link fixed between the inner and outer walls of each side portion.

A further object is to provide a boom support frame having compression links, as defined in the preceding paragraph, which are premachined to a predetermined length and are constructed so as to be assembled by first welding them in abutting relationship to a forward surface of the transmission housing and then by moving them forwardly into engagement with the rear crossbar before welding them to the crossbar and frame sides thus ensuring desired squareness of the transmission housing with the frame.

These and other objects will become apparent from a reading of the following description in conjunction with the appended drawings.

DESCRIPTION OF THE PREFERRED EMBODIMENT

Figure 1:
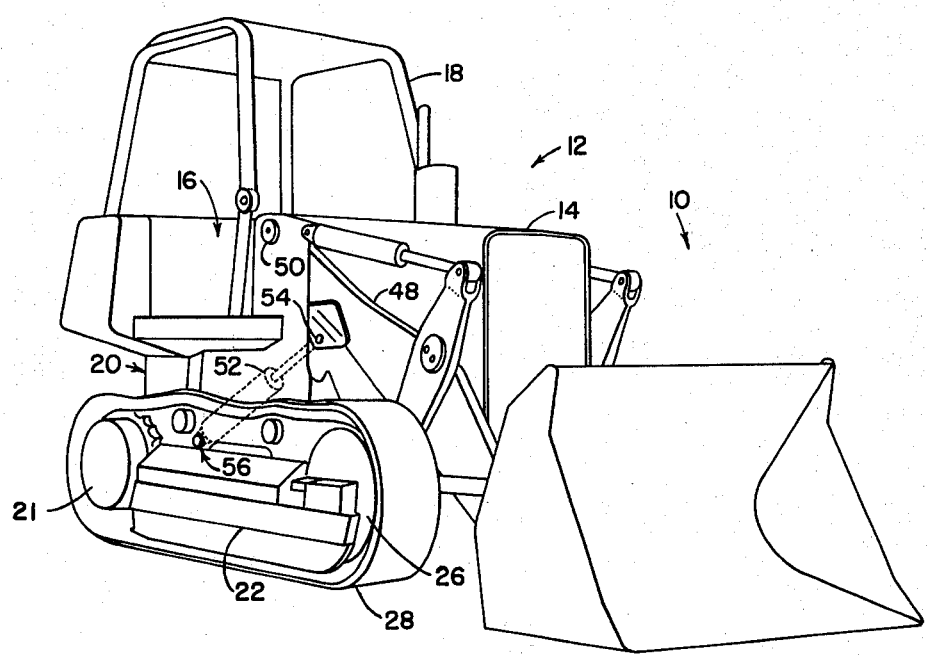
FIG. 1 is a somewhat schematic right front perspective view of a crawler-loader of the type with which the loader boom support frame of the present invention is particularly adapted for use.

Referring now to FIG. 1, therein is shown an industrial vehicle of a type commonly known as a crawler-loader and comprising a loader structure 10 mounted on a track-laying tractor 12. The tractor includes a central longitudinally extending main framework (not shown) which supports an engine (not shown) located within an engine enclosure 14. Rearwardly of the enclosure 14 is an operator's station 16 over which extends a rollover protective framework 18. Extending transversely at the rear of the tractor 12 is a main drive transmission housing 20 having final drive housings (not shown) connected to its opposite sides, the final drive housings each supporting a drive sprocket 21 which is fixed to an output shaft (not shown) of a set of final drive components mounted in the final drive housing. A pair of longitudinally extending track support frames 22 (only one shown) are located at the opposite sides of the tractor 12, and each supports an idler sprocket 24 at its forward end. An endless track 28 is trained about the sprockets 24 and 26 at each side of the tractor 12 in encircling relationship to the frame 22.

Figure 2:
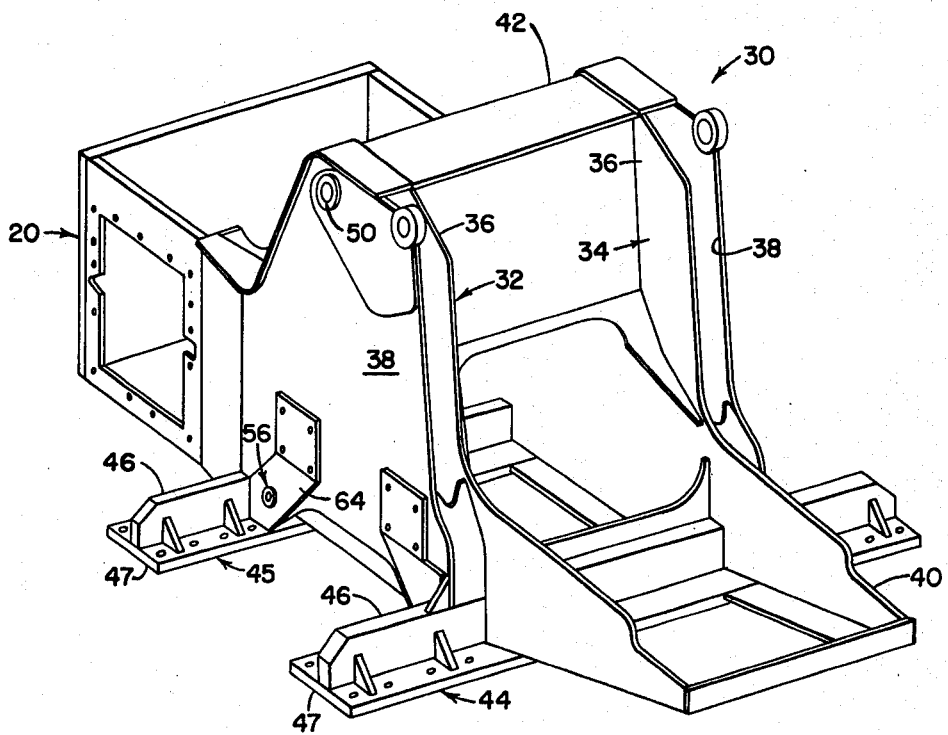
FIG. 2 is a right front perspective view of the loader boom support frame together with an integral main drive transmission housing.

The loader 10 includes a boom support frame 30 (FIG. 2) comprising opposite right and left longitudinally extending upright sides 32 and 34, respectively. The sides 32 and 34 each include a central, double-walled tower portion comprising inner and outer walls 36 and 38, respectively, each of the inner plates 36 having a forward extension 40. The tower portions of the sides 32 and 34 are joined by a connecting structure 42 having its opposite ends welded to the opposite inner walls 36. Fixed to the underside of the frame 30 so as to innerconnect lower front and rear portions of the tower portions of the right and left sides 32 and 34 are front and rear crossbars 44 and 45, respectively. The crossbars 44 and 45 include a vertical section 46 welded to a horizontal lower section 47 such as to be generally inverted T-shaped in end view and the opposite ends thereof are respectively adapted for being bolted to the track frames 22.

The loader 10 includes a pair of booms or arms 48 (only one shown) having their rear ends respectively pivotally connected, as at pivot connections 50, to the frame sides 32 and 34 at upper rear locations of the respective tower portions thereof. Provided at each side of the tractor 12 is an extensible and retractable hydraulic actuator 52 having its opposite ends respectively connected to the adjacent boom 48, as at 54, and the adjacent ones of the sides 32 and 34, as at 56, the latter location being just forwardly of the rear crossbar 45. As can best be seen in FIG. 4, the connection at 56 includes first and second axially aligned tubular members 58 and 60, respectively, located in the inner and outer walls 36 and 38 so as to define a pin receptacle and respectively held in place by flat force-transmitting members 62 and 64 welded to the tubular members 58 and 60 and to the forward side of the rear crossbar 45. A further member 66 is located between the inner and outer walls 36 and 38 and is welded to the tubular members 58 and 60 and to the forward side of the rear crossbar 45. Thus, it will be appreciated that loads imposed on the respective connections at 56 by the rear ends of the lift actuators 52 during elevation of the arms 48 will be transmitted to the rear crossbar 45 by way of the respective tubular members 58 and tubular members 60, the respective plates 62 and plates 64 and by the respective inner members 66.

Figure 4:
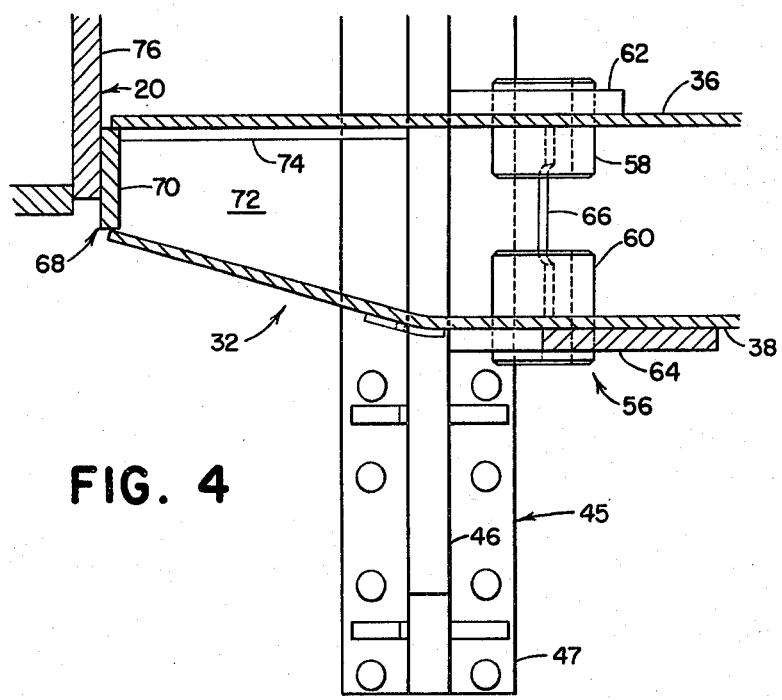
FIG. 4 is a sectional view taken along the line 4—4 of FIG. 3, but showing only the right side of the loader boom support frame.
Figure 3:
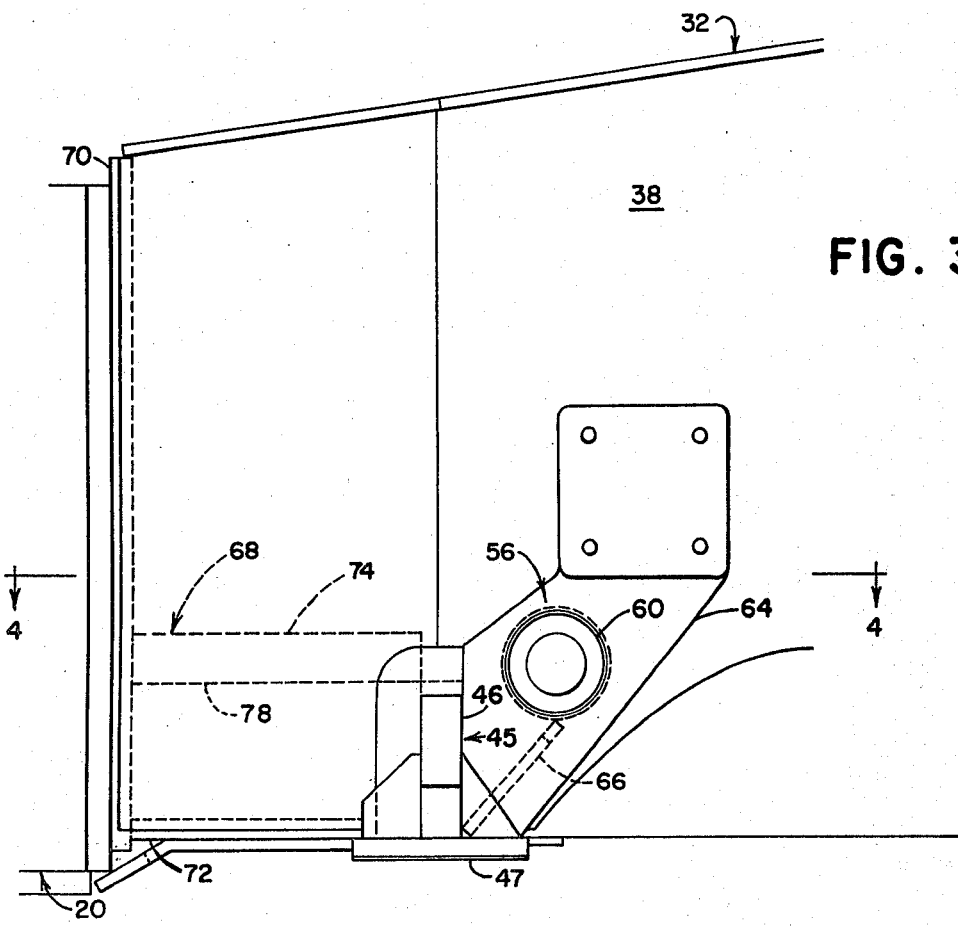
FIG. 3 is a right side elevational view showing the rear portion of the loader boom support frame in which the pin receptacles for receiving pins for connecting the loader boom lift actuators to the boom support frame are located.

For the purpose of transmitting loads from the rear crossbar 45 to the transmission housing 20 at the rear of the frame 30, each of the frame sides 32 and 34 is provided with a compression link 68, only the right link being shown. Each of the compression links 68 comprises a welded assembly including a vertical bar 70 which is rectangular in cross section, a horizontal trapezoidal-shaped plate 72 extending forwardly from and welded adjacent the bottom of the bar 70 and a vertical rectangular plate 74 having its rear end welded in abutting relationship to the bar 70 adjacent the inner edge of the latter and having a lower edge welded to the top surface of the trapezoidal-shaped plate 72 adjacent an inner edge of the latter and has a forward end which terminates in a common transverse vertical plane with the forward end of the plate 72. When the compression link 68 is installed as illustrated in FIGS. 3 and 4, the vertical bar 70 is positioned tight against a forward vertical surface 76 of the transmission housing 20 while the forward ends of the plates 72 and 74 are tight against the vertical section 46 of the rear crossbar 45. Further, the trapezoidal-shaped plate 72 is disposed flat against the upper surface of the horizontal section 47 of the rear cross-bar 45 and an outer edge of the plate 72 abuts against the inside of the outer wall 38 of the frame 30. It is herenoted that the respective inner walls 36 of the boom support frame 30 have lower edge portions 78 which extend horizontally at an elevation above the rear crossbar 45 from a location above the crossbar 45 to the rear end of the walls 36. Extending upwardly along the outer surfaces of the inner walls 36 so as to overlap the lower edges 78 are the rectangular plates 74. So that the transmission housing 20 will be disposed precisely transverse to the frame 30, installation of each of the compression links 68 is performed by first welding the vertical bar 70 to the transmission housing 20 and then by moving the transmission housing and attached compression links forwardly until the forward ends of the plates 72 and 74 are tight against the forward surface of the vertical section 46 of the rear crossbar 45. The plates 72 and 74 are then welded in place.

During operation then it will be appreciated that forces imposed on the frame 30 by reactive forces acting through the lift actuators 52 will be transmitted first to the rear crossbar 45 through means of the plates 62 and 64 fixed to the tubular members 58 and 60 and then to the transmission housing 20 through means of the compression links 68. Further, it will be appreciated that since the compression links 68 are fixed in abutting relationship with the crossbar 45 and transmission housing 20 prior to the welding thereof, the weldments will "see" only minimal shear forces resulting from reactive forces experienced by the frame 30 during lifting of the boom arms 48.

Also, it will be appreciated that during assembly the compression links 68 may be "slipped" fore and aft relative to the frame sides 32 and 34 so as to properly position the transmission housing 20 before the compression links 68 are welded into place.

I claim:
1. In an industrial loader of the track-laying type including a pair of transversely spaced track support frames extending longitudinally at opposite sides of the loader just outboard of a pair of transversely spaced longitudinally extending sides of an upstanding framework secured to the track support frames by longitudinally spaced front and rear crossbars having respective central portions secured to the framework and respective opposite ends secured to the track support frames, a transversely extending transmission housing fixed to the rear of the framework, a loader boom assembly including a pair of loader booms having respective rear ends vertically pivotally connected to upper locations of the opposite sides of the framework, and a pair of extensible and retractable hydraulic actuators having respective first ends respectively coupled to the pair of booms and having respective rear ends respectively coupled to the sides of the framework by a pair of pins respectively received in a pair of pin receptacles respectively located in the pair of sides of the framework, the improvement comprising: said pair of pin receptacles being located adjacent to and forwardly of a forward surface of said rear crossbar; a pair of structural member means respectively connected to the pair of sides of the framework and respectively including a pair of first section means respectively extending between and engaging said pair of pin receptacles and said forward surface of the rear crossbar and a pair of second section means respectively extending between and engaging a rear surface of said rear crossbar and a forward surface of said transmission housing whereby said pairs of structural member means will transfer compressive loads imposed on the pair of actuators by said pair of booms to said rear crossbar, and hence to said track support frame, and to said transmission housing.

2. An industrial loader boom support frame, comprising: a pair of transversely spaced fore-and-aft upstanding sides; transverse structural members interconnecting the sides including a transverse crossbar located rearwardly in said frame and having opposite ends adapted for connection to track frames located at opposite sides of the boom support frame; means for receiving pins for connecting the rear ends of a pair of loader boom lift actuators to the support frame including a pair of tubular pin receptacle means respectively mounted in axial alignment in said pair of upstanding sides so as to define a horizontal transverse pivot axis located forwardly of said and approximately at the same level as said transverse crossbar; a pair of force-transmitting member means respectively connected in force-transmitting relationship between said pair of pin receptacle means and a forward surface of said transverse crossbar; a transverse transmission housing fixed to the rear end of said support frame; and a pair of compression link means each having front and rear ends respectively abutting a rear surface of said crossbar and a front surface of said transmission housing, the pair of link means respectively being welded to the pair of sides and to the transmission housing and crossbar, whereby comparative loads imposed on the pin receptacle means will be first transferred to the crossbar by the pair of force-transmitting member means and then to the transmission housing by the pair of compression link means.

3. The support frame defined in claim 2 wherein the pair of compression link means are premachined to a fixed fore-and-aft dimension and the pair of compression link means respectively being so configured and disposed relative to the pair of sides that during assembly the link means may be first welded to said forward surface of the transmission housing then moved forwardly relative to said sides until a forward surface thereof abuts said rearward surface of the crossbar.

4. The support frame defined in claim 3 wherein each of said pair of sides includes inner and outer walls and each of said compression link means including an upright rear section located between and welded in overlapping relationship to respective rear edges of said walls.

5. The support frame defined in claim 3 wherein said crossbar includes a vertical section and a horizontal section joined such that the crossbar is generally inverted T-shaped in end view; and each of said pair of compression link means including a horizontal plate-like section resting on said horizontal section, having a forward end abutting said vertical section and having an outer edge welded to an inside surface portion of a respective outer wall.

6. The support frame defined in claim 5 wherein each of said pair of the compression link means includes a vertical plate-like section having a rear end welded to said rear section, a forward end welded to said vertical section of the crossbar and a lower edge welded to said horizontal plate section.

7. The support frame defined in claim 5 wherein said vertical plate section is welded to an outer surface portion of and forms a vertical extension of a respective inner wall of said pair of sides.

* * * * *

UNITED STATES PATENT OFFICE
CERTIFICATE OF CORRECTION

Patent No. 3,995,755   Dated 7 December 1976

Inventor(s) Joseph Francis Wagner

It is certified that error appears in the above-identified patent and that said Letters Patent are hereby corrected as shown below:

Column 5, line 5, change "comparative" to --compressive--.

Signed and Sealed this

Twenty-ninth Day of November 1977

[SEAL]

Attest:

RUTH C. MASON  
*Attesting Officer*

LUTRELLE F. PARKER  
*Acting Commissioner of Patents and Trademarks*